United States Patent [19]

Nakada et al.

[11] Patent Number: 6,027,745
[45] Date of Patent: Feb. 22, 2000

[54] PROCESS FOR PRODUCING CONTROLLED DRUG-RELEASE CONTACT LENS, AND CONTROLLED DRUG-RELEASE CONTACT LENS THEREBY PRODUCED

[75] Inventors: Kazuhiko Nakada; Akihisa Sugiyama, both of Kasugai, Japan

[73] Assignee: Menicon Co., Ltd., Nagoya, Japan

[21] Appl. No.: 09/086,575

[22] Filed: May 29, 1998

[30] Foreign Application Priority Data

Jun. 5, 1997 [JP] Japan ..................... 9-148159

[51] Int. Cl.[7] .............. A61F 2/14; A61K 47/30
[52] U.S. Cl. ......................... 424/427; 514/772.3
[58] Field of Search .................... 424/427; 514/772.3

[56] References Cited

U.S. PATENT DOCUMENTS 4,625,007  11/1986  Ellis et al. ..................... 526/279

*Primary Examiner*—Carlos A. Azpuru
*Attorney, Agent, or Firm*—Oblon, Spivak, McClelland, Maier & Neustadt, P.C.

[57] ABSTRACT

A process for producing a controlled drug-release contact lens, containing a first member which forms a front fact of the lens and a second member which forms a rear face of the lens, the first and second members defining a space in the contact lens, which entails a) preparing the first and second members from a non-crosslinked polymer; b) bonding the prepared first and second members by melt pressing; and c) crosslinking the bonded members by hydration treatment, wherein the non-crosslinked polymer is obtained from a polymerizable methoxy silicone compound and another monomer copolymerizable therewith.

15 Claims, No Drawings

PROCESS FOR PRODUCING CONTROLLED DRUG-RELEASE CONTACT LENS, AND CONTROLLED DRUG-RELEASE CONTACT LENS THEREBY PRODUCED

BACKGROUND OF THE INVENTION

1. Field of the Invention

The present invention relates to a process for producing a controlled drug-release contact lens and a controlled drug-release contact lens thereby produced. More particularly, it relates to a process for producing a controlled drug-release contact lens which has high mechanical strength and excellent durability and which is excellent in safety to eye tissues while the gradual releasing property lasts for a long period of time, and a controlled drug-release contact lens produced by such a process.

2. Description of the Background

Heretofore, a cornea disease curing device having a predetermined amount of a drug incorporated in a gradually soluble contact lens-shaped material (JP-Y-57-27456 or a contact lens employing a sustained-release agent capable of slowly dispersing a drug in an eye (JP-A-62-10328 and JP-A-62-10329) has been proposed as a controlled drug-release contact lens. However, such a cornea disease curing device or a contact lens has a drawback the property for gradually releasing the drug hardly lasts, and the curing effects can not adequately be obtained.

Under the circumstances, for the purpose of maintaining the property for gradually releasing the drug for a long period of time, a contact lens has been proposed which has a chamber in its interior, so that a drug to soften the cornea is contained in the chamber, and the drug is gradually supplied to the eye during use of the contact lens (JP-A-7-500267). However, such a contact lens is one produced by bonding front and rear faces of the lens by an adhesive and, as such, has a drawback that the mechanical strength is inadequate, it is poor in durability, and safety to eye tissues is questionable due to the adhesive employed.

SUMMARY OF THE INVENTION

The present invention has been made in view of such prior art, and it is an object of the present invention to provide a controlled drug-release contact lens which has high mechanical strength and excellent durability and which is excellent in safety to eye tissues while the gradual-releasing property lasts for a long period of time, and to provide a process for such a controlled drug-release contact lens.

The present invention provides:

① a process for producing a controlled drug-release contact lens comprising a first member capable of forming a front face of the lens and a second member capable of forming a rear face of the lens, wherein a space is formed by the first and second members in the contact lens, which comprises preparing the first and second members from a non-crosslinked polymer, bonding the prepared first and second members by melt pressing, and crosslinking the bonded members by hydration treatment; and ② a controlled drug-release contact lens produced by the above process, which has a function such that a drug present in the space formed by the first and second members is gradually permeated through the contact lens and gradually released on the cornea during its use.

DETAILED DESCRIPTION OF THE PREFERRED EMBODIMENT

Now, the present invention will be described in detail with reference to the preferred embodiments.

As mentioned above, the controlled drug-release contact lens of the present invention is one comprising a first member capable of forming a front face of the lens and a second member capable of forming a rear face of the lens, wherein a space is formed by these two members in the contact lens, and the process for its production comprises preparing the first and second members from a non-crosslinked polymer, bonding the prepared first and second members by melt pressing, and crosslinking the bonded members by hydration treatment.

In the present invention, the two members constituting the contact lens are made of a non-crosslinked polymer, and a space for storing a drug, is formed by these two members in the contact lens. These two members are bonded by melt pressing. Thus, according to the process of the present invention, it is possible to readily obtain a controlled drug-release contact lens which has high mechanical strength and excellent durability and which is excellent in safety to high tissues, while the gradual releasing property lasts for a long period of time.

In the present invention, the space for storing a drug, which is formed by the above mentioned two members, should not block the field of vision when the contact lens is put on an eye, and such a space is formed outside the lens optical region, usually along the outer circumference of the lens optical region.

Such a space may be formed, for example, by providing a recess in at least one of first and second members, or by differentiating the curvatures of the two members.

In the process of the present invention, firstly, the first member capable of forming a front face of the lens and the second member capable of forming a rear face of the lens, are prepared from a non-crosslinked polymer.

The non-crosslinked polymer is not particularly limited. However, a non-crosslinked polymer obtained by the method disclosed in e.g. JP-A-9-80358, may, for example, be employed, taking into consideration the after-mentioned crosslinkability of the members by hydration treatment, the moldability and the processability. Specifically, such a non-crosslinked polymer is preferably one obtained by polymerizing polymerizable components comprising a polymerizable alkoxysilane compound (A) (hereinafter referred to as a compound (A)) a monomer (B) (hereinafter referred to as a monomer (B)) which has an unsaturated double bond copolymerizable with the compound (A) and which undergoes no crosslinking reaction with the compound (A).

The compound (A) which can be used in the present invention, is a component which undergoes a crosslinking reaction when members made of a non-crosslinked polymer obtained by polymerizing it with other polymerizable component such as a monomer (A), are subjected to hydration treatment.

For example, as shown below, a crosslinking reaction takes place by a condensation (hydrolysis) reaction of alkoxysilane groups themselves derived from the compound (A), which are present in the bonded members, so that the resulting controlled drug-release contact lens will have a crosslinked structure (in the following formulas, R is an alkyl group).

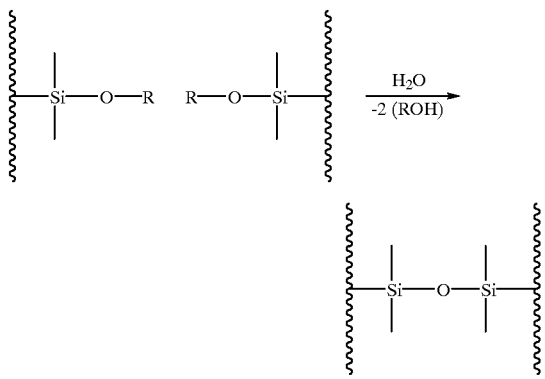

In the present invention, in order to maintain the gradual drug-releasing property of the resulting contact lens, it is usually preferred that the water content of the contact lens is adjusted to be from 50 to 90 wt %. If such a water content is lower than 50 wt %, the gradual drug-releasing property or the dimensional stability of the contact lens tends to deteriorate. On the other hand, if it exceeds 90 wt %, the mechanical strength of the contact lens tends to be low.

The compound (A) is one having an alkoxy group bonded on its silicon atom. Accordingly, when such a compound (A) is used, the condensation reaction (a crosslinking reaction) swiftly proceeds as compared with a silane compound having an alkoxy group having at least two carbon atoms bonded to its silicon atom. Therefore, even if the resulting non-crosslinked polymer has high water absorptivity, it is unlikely that the hydration swelling rate of a shaped product obtained from such a non-crosslinked polymer becomes larger than the crosslinking rate of the shaped product. Accordingly, the bonded members having a desired lens shape will be crosslinked substantially in such a shape i.e. not in a swelled and deformed state, whereby a controlled drug-release contact lens having a desired shape with extremely high precision, can be obtained.

As a typical example of the compound (A), a polymerizable metoxysilane compound of the formula (I):

$$X\text{—}Z\text{—}Si(OCH_3)_n(R^1)_{3-n} \quad (I)$$

wherein X is a (meth)acryloyloxy group, vinyl group, a group of the formula:

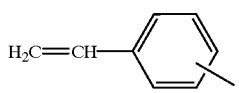

or an allyl group, Z is a direct bond or a $C_{1-3}$ alkylene group, $R^1$ is a $C_{1-6}$ alkyl group and n is an integer from 1 to 3, may, for example, be mentioned.

In the above formula (I), each of the (meth)acryloyloxy group, the vinyl group, the group of the formula:

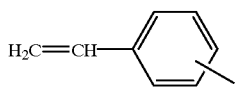

and the allyl group, represented by X, is a polymerizable group containing an unsaturated double bond. Said Z, $R^1$ and n may suitably be determined taking the reactivity for the condensation reaction into consideration In the specification, "(meth)acryl . . ." means "acryl . . . and/or methacryl. . . ".

Typical examples of the polymerizable metoxysilane compound of the above formula (I ) include trimethoxysilylpropyl (meth)acrylate, vinylpropyltrimethoxysilane and trimethoxysilylstyrene. These compounds may be used alone or in combination as a mixture of two or more of them.

The amount of the compound (A) in the polymerizable components, is preferably adjusted to be at least 3 parts by weight, preferably at least 5 parts by weight, per 100 parts by weight of the after-mentioned monomer (B), in order to sufficiently obtain crosslinking effects when a controlled drug-release contact lens is obtained. Further, with a view to maintaining the water content of from 50 to 90 wt % which is usually desired to maintain the gradual drug-releasing property of the resulting contact lens, the amount of the compound (A) in the polymerizable components is preferably adjusted to be at most 30 parts by weight, preferably at most 28 parts by weight, per 100 parts by weight of the monomer (B).

The monomer (B) which can be used in the present invention, is a monomer which has an unsaturated double bond copolymerizable with the compound (A) and which undergoes no crosslinking reaction with the compound (A). Such a monomer (B) may, for example, be one having one copolymerizable unsaturated double bond, i.e. a monomer other than a crosslinkable monomer or a crosslinkable macro-monomer having at least two polymerizable groups.

Typical examples of the monomer (B) include a hydroxyl group-containing monomer, such as hydroxystyrene, or a hydroxyalkyl (meth)acrylate such as 2-hydroxyethyl (meth)acrylate, hydroxybutyl (meth)acrylate or hydroxypropyl (meth)acrylate; an amino group-containing monomer, such as an amino styrene, or an (alkyl)amino alkyl (meth)acrylate such as 2-dimethylaminoethyl (meth)acrylate or 2-butylaminoethyl (meth)acrylate; an amide type monomer, such as a dialkyl (meth)acrylamide such as N,N-dimethyl (meth)acrylamide, N,N-diethyl (meth)acrylamide or N,N-methylethyl (meth)acrylamide, or an alkyl (meth) acrylamide such as metyl (meth)acrylamide or ethyl (meth) acrylamide; an alkylene glycol mono (meth)acrylate such as propyrene glycol mono (meth)acrylate; a pyrrolidone type monomer such as vinyl pyrrolidone; and a monomer effective for imparting the desired water content to the controlled drug-release contact lens such as (meth)acrylic acid, maleic anhydride, maleic acid or a fumaric acid derivative. These monomers may be used alone or in combination as a mixture of two or more of them.

Further, for example, when it is desired to adjust the hardness of the controlled drug-release contact lens to impart desired softness, one or more hardness-controlling monomers may be selected and used as the monomer (B) from e.g. a linear, branched or cyclic alkyl (meth)acrylate, alkoxyalkyl (meth)acrylate or alkylthioalkyl (meth)acrylate, such as methyl (meth)acrylate, ethyl (meth)acrylate, isopropyl (meth)acrylate, n-propyl (meth)acrylate, isobutyl (meth) acrylate, n-butyl (meth)acrylate, 2-ethylhexyl (meth) acrylate, n-octyl (meth)acrylate, 2-decyl (meth)acrylate, n-dodecyl (meth)acrylate, t-buthyl (meth)acrylate, pentyl (meth)acrylate, t-pentyl (meth)acrylate, hexyl (meth) acrylate, heptyl (meth)acrylate, nonyl (meth)acrylate, stearyl (meth)acrylate, cyclopentyl (meth)acrylate, cyclohexyl (meth)acrylate, 2-ethoxyethyl (meth)acrylate, 3-ethoxypropyl (meth)acrylate, 2-methoxyethyl (meth) acrylate, 3-methoxypropyl (meth)acrylate, ethylthioethyl (meth)acrylate or methylthioethyl (meth)acrylate; styrene; α-methyl styrene; an alkyl styrene ethyl styrene, propyl styrene, butyl styrene, t-butyl styrene, isobutyl styrene or pentyl styrene; an alkyl-α-methyl styrene, such as methyl-α-methyl styrene, ethyl-α-methyl styrene, propyl-α-methyl styrene, butyl-α-methyl styrene, t-butyl-α-methyl styrene, isobutyl-α-methyl styrene or pentyl-α-methyl styrene. Among these, an alkyl (meth)acrylate and an alkyl styrene are particularly preferred, since they are excellent, for example, in copolymerizability with the compound (A). It is preferred to use a monomer which, when made into a homopolymer, gives a glass transition point (hereinafter referred to as Tg) of at most 40° C.

Further, for example, when it is desired to impart oxygen permiability to the controlled drug-release contact lens, a silicon-containing monomer other than the compound (A) may be used as the monomer (B), such as an organo polysiloxane-containing alkyl (meth)acrylate such as pentamethyldisiloxanylmethyl (meth)acrylate, trimethylsioxydimethylsilylpropyl (meth)acrylate, methylbis (trimethylsiloxy)silylpropyl (meth)acrylate, tris(trimethylsiloxy)silylpropyl (meth)acrylate, mono[methylbis(trimethylsiloxy)siloxy]bis(trimethylsiloxy)silylpropyl (meth)acrylate, tris[methylbis(trimethylsiloxy)siloxy]silylpropyl (meth)acrylate, methyl[bis(trimethylsiloxy)]silylpropylglyceryl (meth)acrylate, tris(trimethysiloxy)silylpropylglyceryl (meth)acrylate, mono[methylbis(trimethylsiloxy)siloxy]bis(trimethylsiloxy)silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy)silylethyltetramethyl disiloxanylmethyl (meth)acrylate, tetramethyltriisopropylcyclotetrasiloxanylpropyl (meth)acrylate, tetramethyltriisopropylcyclotetrasiloxybis(trimethyl siloxy)silylpropyl (meth)acrylate or trimethylsiloxydimethylsilylpropyl (meth)acrylate; an alkylvinyl silane such as trimethyl vinyl silane; or a silicon-containing styrene derivative of the formula (II):

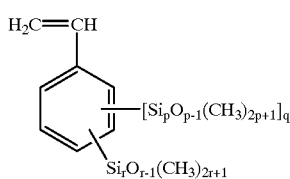

(II)

wherein p is an integer of from 1 to 15, q is 0 or 1, and r is an integer of from 1 to 15.

With the silicon-containing styrene derivative of the formula (II), if p or r is an integer of 16 or more, it becomes difficult to synthesize or purify such a derivative, and the hardness of the controlled drug-release contact lens thereby obtainable, tends to be very low, and if q is an integer of 2 or more, it tends to be difficult to synthesize such a silicon-containing styrene derivative.

Typical examples of the silicon-containing sytrene derivative of the above formula (II) include tris(trimethylsiloxy)silylstyrene, bis(trimethylsiloxy)methylsilylstyrene, dimethylsilylstyrene, trimethylsilylstyrene, tris(trimethylsiloxy)siloxanyldimethylsilylstyrene, [bis(trimethylsiloxy)methylsiloxanyl]dimethylsilylstyrene, pentamethyldisiloxanylstyrene, heptamethyltriciroxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris(pentametyldisiloxy)silylstyrene, (tristrimethylsiloxy)siloxanylbis(trimethylsiloxy)silyl styrene, bis(heptamethyltrisiloxy)methylsilylstyrene, tris(methylbistrimethylsiloxysiloxy)silylstyrene, trimethylsiloxybis(tristrimethylsiloxysiloxy)silylstyrene, heptaxis(trimethylsiloxy)trisiloxanylstyrene, tris(tristrimethylsiloxysiloxy)silylstyrene, (tristrimethylsiloxyhexamethyl)tetrasiloxy(tristrimethyl siloxy)siloxytrimethylsiloxysilylstyrene, nonaxis(trimethylsiloxy)tetrasiloxanylstyrene, bis(tridecamethylhexasiloxy)methylsilylstyrene, heptamethylcyclotetrasiloxyanylstyrene, heptamethylcyclotetrasiloxybis(trimethylsiloxy)silyl styrene, and tripropyltetramethylcyclotetrasiloxyanylstyrene.

These silicon-containing monomers may be used alone or in combination as a mixture of two or more of them. Among them, tris(trimethylsiloxy)silylpropyl (meth)acrylate among organopolysiloxane-containing alkyl (meth)acrylates, or tris(trimethylsiloxy)silylstyrene among silicon-containing styrene derivatives, is particularly preferred, since it is excellent, for example, in copolymerizability with the compound (A).

Further, for example, when it is desired to impart deposit resistance to the controlled drug-release contact lens, it is possible to employ as the monomer (B) a fluorine-containing monomer of the formula (III)

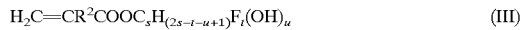

(III)

wherein $R^2$ is a hydrogen atom or a methyl group, s is an integer of from 1 to 15, t is an integer of from 1 to (2S+1), and u is an integer of from 0 to 2.

Typical examples of the fluorine-containing monomer of the above formula (III) include 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,6,6,7,7,8,9,9,9-dodecafluoro-8-trifluoromethylnonyl (meth)acrylate and 2-hydroxy-4,4,5,5,6,6,7,7,8,8,9,9,10,11,11,11-hexadecafluoro-10-trifluoromethylundecyl (meth)acrylate. These monomers may be used alone or in combination as a mixture of two or more of them.

Further, among them, 2,2,2-trifluroethyl (meth)acrylate and 2,2,2,2',2',2'-hexafluroisopropyl (meth)acrylate are particularly preferred, since they are excellent, for example, in copolymerizability with the compound (A). Further, to impart ultraviolet absorptivity to the resulting controlled drug-release contact lens, or to color the controlled drug-release contact lens, a polymerizable ultraviolet absorber, a polymerizable dyestuff or a polymerizable ultraviolet absorbing dyestuff having a color-forming functional group or an ultraviolet absorptive functional group, may, for example, be used as the monomer (B).

Typical examples of the polymerizable ultraviolet absorber include benzophenone type polymerizable ultraviolet absorbers such as 2-hydroxy-4-(meth)acryloyloxybenzophenone, 2-hydroxy-4-(meth)acryloyloxy-5-tert-butylbenzophenone, 2-hydroxt-4-(meth)acryloyloxy-2',4'-dichlorobenzophenone and 2-hydroxy-4-(2'-hydroxy-3'-(meth)acriloyloxypropoxy)benzophenone; benzotriazole type polymerizable ultraviolet absorbers such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole and 2-(2'-hydroxy-5'-(meth)acryloyloxypropyl-3'-tert-buthylphenyl)-5-chloro-2H-benzotriazole; salicylic acid derivative-type polymerizable ultraviolet absorbers such as phenyl 2-hydorxy-4-(meth)acryloyloxymetnylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more of them.

Typical examples of the polymerizable dyestuff include azo type polymerizable dyestuffs such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-($\alpha$-anthrylazo)-2-hydroxy-3-(meth)acryloyloxynaphthalene, 1-((4'-(phenylazo)phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamide-anilino)-4,6-bis(1'-(o-tolylazo)-2'-naphthylamino)-1,3,5-triazine, 2-(m-vinylanilino)-4-((4'-nitrophebylazo)anilino)-6-chloro-1,3,5-triazine, 2-(1'-(o-tolylazo)-2'-naphthyloxy-4-(m-vinylanilino)6-chloro-1,3,5-triazine, 2-(p-vinylanilino)-4-(1'-(o tolylazo)-2'-naphthylamino)-6-chloro-1,3,5-triazine, N-(1'-(o-tolylazo)-2'naphthyl)-3-vinylphthalic acid monoamide, N-(1'-(o-tolylazo)-2'-naphthyl)-6-vinylphthalic acid monoamide, 3-vinylphthalic acid-(4'-(p-sulfophenylazo)-1'-naphthyl)monoester, 6-vinylphthalic acid-(4'-(p-sulfophenylazo)-1'-naphthyl)monoester, 3-(meth)acryloylamide-4-phenylazophenol, 3-(meth)acryloylamide-4-(8'-hydroxy-3'6'-disulfo-1'-naphthylazo)phenol, 3-(meth)acryloylamide-4-(1'-phenylazo-2'-naphthylazo)phenol, 3-(meth)acryloylamide-4-(p-tolylazo)phenol, 2-amino-4-(m-(2'-hydroxy-1'-naphthylazo)-anilino)-6-isopropenyl-1,3,5-triazine, 2-amino-4-(N-methyl-p-(2'-hydroxy-1'-naphthylazo)amilino)-6-isopropenyl-1,3,5-triazine, 2-amino-4-(m-(4'-hydroxy-1'-phenylazo)anilino)-6-isopropenyl-1,3,5-triazine, 2-amino-4-(N-methyl-p-(4'-hydroxyphenylazo)amilino)-6-isopropenyl-1,3,5-triazine, 2-amino-4-(m-(3'-methyl-1'-phenyl-5'-hydroxy-4'-pyrazolylazo)anilino)-6-ispropenyl-1,3,5-triazine, 2-amino-4-(N-methyl-p-(3'-methyl-1'-phenyl-5'-hydroxy-4'-pyrazolylazo)amilino)-6-isopropenyl-1,3,5-triazine, 2-amino-4-(p-phenylazoanilino)-6-isopropenyl-1,3,5-triazine and 4-phenylazo-7-(meth)acryloylamide-1-naphthol; anthraquinone type polymerizable dyestuffs such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-(4'-vinylbenzoylamide)-9,10-anthraquinone, 1,4-bis-(4'-isopropenylbenzoylamide)- 9,10-anthraquinone, 1,5-bis-(4'-vinylbenzoylamide)-9,10-anthraquinone, 1,5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anithraquinone-2-sulfonic acid, 1-($\beta$-ethoxycarbonylallylamino)-9,10-anthraquinone, 1-($\beta$-carboxyallylamino)-9,10-anthraquinone, 1,5-di-($\beta$-carboxyallylamino)-9,10-anthraquinone, 1-($\beta$-isopropoxycarbonylallylamino)-5-benzoylamide-9,10-anthraquinone, 2-(3'-(meth)acryloylamide-anilino)-4-(3'-(3"-sulfo-4"-aminoanthraquinon-1"-yl)amino-anilino)-6-chloro-1,3,5-triazine, 2-(3'-(meth)acryloylamide-anilino)-4-(3'-(3"-sulfo-4"-aminoanthraquinon-1"-yl)amino-anilino)-6-hydrazino-1,3,5-triazine, 2,4-bis-((4"-methoxyanthraquinon-1"-yl)amino)-6-(3'-vinylanilino)-1,3,5-triazine and 2-(2'-vinylphenoxy)-4-(4'-3"-sulfo-4"-aminoanthraquinon-1"-yl-amino)anilino)-6-chloro-1,3,5,triazine; nitro type polymerizable dyestuffs such as o-nitroanilinomethyl (meth)acrylate; and phthalocyanine type polymerizable dyestuffs such as (meth)acryloyl-modified tetraamino copper phthalocyanine and (meth)acryloyl-modified (dodecanoyl-modified tetraamino copper phthalocyanine). These polymerizable dyestuffs may be used alone or in combination as a mixture of two or more of them.

Typical examples, of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy- 3-(o-(meth)acryloyloxypropylphenylazo)benzophenone, 2,4-dihydroxy-5-(o-(meth)acryloyloxypropylphenylazo) benzophenone, 2,4-dihydroxy-3-(p-(N,N-di(meth) acryloyloxyethylamino)phenylazo)benzophenone, 2,4-dihydroxy-5-(p-(N,N-di(meth)acryloyloxyethylamino) pheylazo)benzophenone, 2,4-dihydroxy-3-(o-(N,N-di(meth) acryloyloxyethylamino)phenylazo)benzophenone, 2,4-dihydroxy-5-(o-(N,N-di(meth)acryloylethylamino) phenylazo)benzohenone, 2,4-dihydroxy-3-(p-(N-ethyl-N-(meth)acryloyloxyethylamino)phenylazo)benzophenone, 2,4-dihydroxy-5-(p-(N-ethyl-N-(meth) acriloyloxyethylamino)phenylazo)benzophenone, 2,4-dihydroxy-3-(o-(N-ethyl-N-(meth)acryloyloxyethylamino) phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino) phenylazo)benzophenone, 2,4-dihydroxy-5-(p-(N-ethyl-N-(meth)acryloylamino)pehnylazo)benzophenone, 2,4-dihydroxy-3-(o-N-ethyl-N-(meth)acryloylamino) phenylazo)benzophenone and 2,4-dihydroxy-5-(o-(N-ethyl-N-(meth)acryloylamino)phenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more of them.

In the present invention, various monomers may be used as the monomer (B), as mentioned above. However, other material, for example, non-water absorptive material such as silicon rubber, urethane rubber, (meth)acrylic copolymer or silicon oligomer, may also be used in the same manner as the monomer (B), so long as it is copolymerizable with the compound (A), and it undergoes no crosslinking reaction with the compound (A).

Further, for example, if the above monomer (B) is a monomer having a functional group such as a hydroxyl group, it is likely that such a functional group preliminarily reacts with the alkoxysilane group in the compound (A) to form many crosslinked structures. Therefore, as the monomer (B), it is preferred to employ a monomer which does not have a functional group such a hydroxyl group, a carboxy group, an amino group or a glycol residue, which is likely to react with the alkoxysilane group in the compound (A).

In the present invention, the non-crosslinked polymer may be a polymer wherein a crosslinked structure is partially formed to such an extent not to impair the object of the present invention, for example, a polymer having a partially crosslinked structure formed, which is obtained by using a monomer containing a functional group such as a hydroxyl group.

The amount of the monomer (B) in the polymerizable components may suitably be adjusted depending upon the amount of the compound (A), and it may be an amount whereby a water content of from 50 to 90 wt % can be maintained which is usually desired to maintain the gradual drug-releasing property of the resulting contact lens.

When the above mentioned polymerizable ultraviolet absorber, the polymerizable dyestuff and the polymerizable ultraviolet absorbing dyestuff, are used as the monomer (B), their content in the copolymerizable components is substantially influenced by the thickness of the contact lens, but, in order to obtain the effects of using them sufficiently, their amount is preferably at least 0.001 part by weight, more preferably at least 0.01 part by weight, per 100 parts by weight of the total amount of the polymerizable components. Further, in order to avoid deterioration of the physical properties of the contact lens, such as mechanical strength, it is usually at most 3 parts by weight, preferably at most 2 parts by weight, per 100 parts by weight of the total amount of the polymerizable components. Further, taking into consideration the toxicity of the ultraviolet absorber or the dyestuff, it is advisable to make the contact lens suitable for direct contact with living tissues. Further, particularly in the case of a dyestuff, it is advisable to take a due care to avoid the possibility that the color of the contact lens tends to be so deep that the transparency decreases, and visible light tends to be hardly transmitted through the controlled drug-release contact lens.

The non-crosslinked polymer to be used in the present invention, can be prepared, for example, by polymerizing the polymerizable components comprising the above compound (A) and the monomer (B).

In the present invention, the polymerization can be carried out by a conventional method by adjusting the amounts of the compound (A) and the monomer (B) and adding, for example, a radical polymerization initiator thereto.

The conventional method is, for example, a method wherein a radical polymerization initiator is added to the polymerizable components in a suitable mold or container, followed by gradual heating within a temperature range of from room temperature to 130° C. for from 2 to 72 hours or by irradiation of an electromagnetic wave such as microwave, ultraviolet rays or a radiation (such as γ-rays). In the case of heat polymerization, the temperature may be raised stepwise, and hardening may be carried out. The polymerization may be carried out by a bulk polymerization method or a solution polymerization method employing e.g. a solvent such as tetrahydrofuran or toluene, or by other methods.

Typical examples of the above-mentioned radical polymerization initiator include azobisisobutyronitrile, azobisdimethylvaleronitrile, benzoyl peroxide, t-butyl hydroperoxide and cumene hydroperoxide. These initiators may be used alone or in combination as a mixture of two or more of them.

In a case where the polymerization is carried out by means of e.g. light rays, it is preferred to further incorporate a photopolymerization initiator or a sensitizer. The amount of such a photopolymerization initiator or a sensitizer is usually from 0.001 to 2 parts by weight, preferably from 0.01 to 1 part by weight, per 100 parts by weight of the total amount of the polymerizable components.

The non-crosslinked polymer to be used in the present invention, may be of any shape so long as it is possible to obtain the first and second members therefrom. For example, a shape such as rod-shape, a block-shape, a plate-shape or a sheet-shape may be mentioned. To obtain a non-crosslinked polymer of a rod-shape, a block-shape, a plate-shape or a sheet-shape, polymerization of the polymerizable component may be carried out in a mold or container such as a test tube or a cell mold.

The non-crosslinked polymer thus obtained, preferably has a number average molecular weight of at least about 10,000, so that alkoxysilane groups are sufficiently present in its one molecule, and the crosslinking reaction of the members produced from such a non-crosslinked polymer and bonded, sufficiently proceeds. Further, in order to maintain the flowability of the members during the production, the number average molecular weight of the non-crosslinked polymer is preferably at most about 1,000,000.

Then, the first and second members are produced from the above non-crosslinked polymer.

The method for producing the first and second members is not particularly limited. For example, a method may be employed wherein a non-crosslinked polymer of a rod-shape or a block-shape is cut out in a desired thickness to obtain a member of a plate-shape or a sheet-shape, or a non-crosslinked polymer of a plate-shape or a sheet-shape may be used as it is, as a member, and a desired recess may be formed in such a member.

The shape of the space formed in a contact lens by the recesses in the members, is not particularly limited, and it may, for example, be a ring-shape or a spherical shape. However, it is preferably a ring-shape, since such is excellent in moldability, and a uniform gradual releasing property can be maintained. Such a ring-shaped space preferably has an inner diameter of from 3 to 10 mm taking into consideration a usual diameter of a contact lens and its lens optical region, and it is preferred that the width is from about 0.1 to 3 mm, and the depth is from about 0.02 to 0.3 mm.

Such a space may be formed by the first and second members. However, as mentioned above, such a space is preferably formed by providing a recess in at least one of these two members. Namely, it is preferred that at least one of the two members has a recess capable of forming a space by these two members in a contact lens.

The method for forming a recess in a member is not particularly limited, and, for example, it is possible to employ a method of applying mechanical processing such as cutting and grinding to obtain a desired shape.

Then, the first and second members thus obtained, are bonded by melt pressing.

In the process of the present invention, there is one of substantial features in bonding the first and second members by such melt pressing. According to the process of the present invention, the first and second members will be bonded by melt pressing, whereby the resulting controlled drug-release contact lens will have high mechanical strength and excellent durability, as is different from a case of conventional bonding with an adhesive or the like. Further, there is no such a conventional drawback that the safety to eye tissues deteriorates due to the adhesive employed.

The method for bonding the first and second members by melt(hot) pressing, may, for example, be a method wherein a compression molding machine is prepared which is provided with a mold having a desired contact lens shape or a mold having a plate shape, the first and second members prepared as described above, are overlaid one on the other so that a space is formed by these first and second members in a finally obtainable contact lens, then they are put in the above mold, the mold is then closed, pressurizing and heating are carried out usually under a pressure of from 100 to 1,300 kgf/cm$^2$ over a period of from 5 to 50 minutes to cure the members, the mold is then opened, and, if necessary, mechanical processing such as cutting, grinding, or polishing is applied to obtain the bonded members.

The heating temperature of the two members at the time of bonding them by the above melt pressing, is preferably a temperature higher by from 50 to 160° C. than Tg of the non-crosslinked polymer constituting these members.

Then, hydration treatment is applied to the members bonded as described above, for crosslinking, to obtain the desired controlled drug-release contact lens.

To apply the hydration treatment to the bonded members, the bonded members may, for example, be contacted with moisture, and such a method may, for example, be an in-water boiling treatment method, an autoclave (high temperature high pressure steam) treatment method, an acid treatment method, an in-water treatment method or a method of leaving the members under a high humidity.

The above in-water boiling treatment method is a method in which the bonded members are immersed in a water bath, followed by boiling treatment for from 1 to 72 hours.

The above autoclave method is a method in which the bonded members are immersed in e.g. a physiological saline solution, and then they are subjected to autoclave treatment at a temperature of about 121° C.

The above acid treatment method is a method wherein the bonded members are immersed in a solution of an acid, such as a hydrochloric acid solution of from 0.001 to 1N, for acid treatment.

The above in-water treating method is a method wherein the bonded members is immersed in water at a temperature of from about 20 to 60° C. for from 5 to 120 minutes.

The above method for leaving the members under a high humidity is a method wherein the bonded members are left to stand in a high humidity atmosphere having, for example, a relative humidity of from 80 to 100%, for from 2 to 72 hours.

In the present invention, two or more of these methods may be combined to apply hydration treatment to the bonded members.

The controlled drug-release contact lens of the present invention thus obtainable, is one having a function such that a drug present in the space formed by the first and second members, is gradually permeated through the contact lens and gradually released on the cornea during its use.

The drug to be present in the space formed by the first and second members, is not particularly limited, and it may suitably be determined depending upon the purpose of use of the controlled drug-release contact lens.

The above drug may, for example, be any one of common ophthalmic agents as disclosed in e.g. JP-A-8-104630, JP-B-59-7684 and JP-A-7-503974, such as preventive or curing agents for an eye trouble such as inflammation or wound, diagnostic agents, or immunosuppressive agents, in the form of eye drops or their active ingredients in general. Specific examples of such a drug include a lacrimation increasing agent, a cell propagation accelerator, a suppressant against increase of the corneal thickness, a mydriatic, a miotic, an antibiotic, a fungicide, an antihistamine, an anti-inflammatory agent, an anticholinergic, an antiglaucoma compound, an anthelminthick compound, an antivirus agent, a carbonate dehydrarase inhibitor, an antifungal agent, an anaesthetic agent, a peptide, and a protein.

The method for introducing the drug into the space formed by the first and second members, is not particularly limited. For example, there may be mentioned a method wherein the obtained contact lens is immersed in a drug or in a liquid containing the drug in the water for hydration, to have the drug permeated and introduced into the space, a method wherein the drug is injected into the space by e.g. an injector, a method wherein a drug having a stability at the molding temperature may be put in the form of the powdery agent, followed by molding, or a method wherein a hole may be formed in the contact lens by a laser or the like, and then the contact lens may be immersed in the drug, or the drug may be injected into the space by an injector through the hole. The amount of the drug present in the space formed by the first and second members may suitably be adjusted depending upon e.g. the effectiveness of the drug or the size of the space.

The drug present in the space is usually gradually permeated through the contact lens and gradually released on the cornea during its use. However, in a case where hole is provided as mentioned above, the drug may be permeated and gradually released through such a hole.

Thus, the controlled drug-release contact lens obtainable by the process of the present invention, has high mechanical strength and excellent durability and is excellent in safety to eye tissues, while the gradual releasing property lasts for a long period of time, whereby it is suitable for use as an ophthalmic contact lens for e.g. various preventive, curing, diagnostic or immunosuppressive purposes.

Now, the process for producing the controlled drug-release contact lens of the present invention and the controlled drug-release contact lens thereby obtained, will be described in further detail with reference to Examples. However, it should be understood that the present invention is by no means restricted to such specific Examples.

EXAMPLE 1

(1)Preparation of a Polymer (a Non-crosslinked Polymer) Having Methoxysilane Groups on its Side Chains As polymerizable components, 30 parts by weight of p-trimethoxysilylstyrene of the formula:

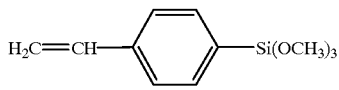

68 parts of N-vinylpyrrolidone, 12 parts by weight of tris(trimethylsiloxy)silylstyrene and 2 parts by weight of a silicone oligomer having methoxysilane groups at both terminals, represented by the formula:

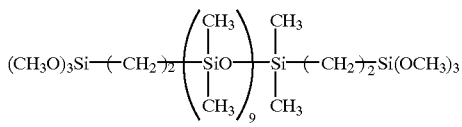

and, as a polymerization initiator, 0.1 part by weight of azobisisobutyronitrile, per 100 parts by weight of the copolymerizable components, were mixed and sealed in a test tube.

Then, the above test tube was immersed in a constant temperature water tank, and the polymerizable components were polymerized over 48 hours while gradually raising the temperature from 35° C. to 50° C.

Then, the test tube was transferred to a dryer, and hardening was carried out while gradually raising the temperature to 120° C. over a period of 14 hours, to obtain a non-crosslinked polymer of a rod-shape having a diameter of about 15 mm. The number average molecular weight of the non-crosslinked polymer was about 320,000, and the Tg was 92° C.

(2)Preparation of a First Member Capable of Forming a Front Face of the Lens and a Second Member Capable of Forming a Rear Face of the Lens The obtained non-crosslinked polymer of a rod-shape was cut to obtain two plate-shaped members having a thickness of 1 mm. In one of these two members, a ring-shaped recess having an inner diameter of 7.5 mm, a width of 1 mm and a depth of 0.05 mm, was formed by cutting work.

(3)Bonding of the First and Second Members by Melt Pressing

The two members were overlaid one on the other so that the formed recess would be sealed inside, and they were put in a mold corresponding to the shape of a contact lens (thickness: 0.25 mm, diameter: 15 mm), mounted on a compression molding machine. After closing the mold, the members were cured by pressurizing under a pressure o f 820 kgf/cm² and heating at a temperature of 250° C., over a period of 35 minutes. Then, the mold was opened, and the molded product was taken out and subjected to cutting work to obtain the bonded members of a contact lens shape in a dried state (thickness: 0.25 mm, diameter: 15 mm).

(4)Crosslinking of the Bonded Members by Hydration Treatment

Then, the bonded members were immersed in a physiological saline solution, and they were put into an autoclave and treated with a high temperature high pressure steam of 121° C. for 20 minutes for crosslinking, to obtain a controlled drug-release contact lens. The water content of this hydration-treated controlled drug-release contact lens was obtained by dividing the difference between the weight in the equilibrium water-containing state and the weight in a dried state by the weight in the equilibrium water-containing state, and was found to be 55 wt %.

The size of the obtained controlled drug-release contact lens was measured, whereby the thickness was 0.25 mm, and the diameter was 15 mm, which are the same as the desired size, and thus the product was one produced with high precision. Further, the lens optical region of this controlled drug-release contact lens is a circular region extending over a diameter of 7.5 mm from the center.

A force was exerted to the controlled drug-release contact lens by fingers, whereby the strength was found to be high without breakage.

Further, the obtained controlled drug-release contact lens was immersed in an ophthalmic solution (a 5% hydrochloric acid calteorol aqueous solution), and then it was put on a rabbit eye. Upon expiration of 36 hours, the intraocular pressure was measured, whereby the intraocular pressure was lower than before the contact lens was put thereon, thus indicating that the gradual-releasing property lasted for a long period of time.

The controlled drug-release contact lens obtained by the process of the present invention, is one which has high mechanical strength and excellent durability and which is excellent in safety to eye tissues, while the gradual-releasing property lasts for a long period of time. Accordingly, the controlled drug-release contact lens of the present invention is suitable for use as an ophthalmic contact lens for various preventive, curing, diagnostic or immunosuppressive purposes.

What is claimed is:

1. A process for producing a controlled drug-release contact lens, comprising a first member which forms a front face of the lens and a second member which forms a rear face of the lens, said first and second members defining a space in the contact lens, which comprises:

a) preparing the first and second members from a non-crosslinked polymer;

b) bonding the prepared first and second members by melt pressing; and c) crosslinking the bonded members by hydration treatment;

wherein the non-crosslinked polymer is obtained by polymerizing polymerizable components, comprising a polymerizable alkoxy silane compound (A) and a monomer (B) which has an unsaturated double bond copolymerizable with the polymerizable alkoxy silane compound (A) and which undergoes no crosslinking reaction with the polymerizable alkoxy silane compound (A);

wherein the polymerizable alkoxy silane compound (A) is a polymerizable methoxy silane compound having the formula (I):

wherein X is a (meth)acryloyloxy group, a vinyl group, an allyl group, or a group with the formula:

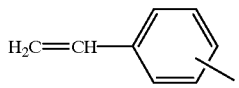

wherein Z is a direct bond or a $C_1$–$C_3$ alkylene group, $R^1$ is a $C_1$–$C_6$ alkyl group, and n is an integer of from 1 to 3.

2. The process of claim 1, wherein at least one of the first and second members has a recess which forms the space formed by the first and second members of the contact lens.

3. The process of claim 2, wherein the recess forms a ring-shaped space in the contact lens, and the inner diameter of the ring-shaped space is from 3 to 10 mm.

4. The process of claim 1, wherein the controlled drug-release contact lens has a water content of from 50 to 90 wt.%.

5. The process of claim 1, wherein the polymerizable methoxy silane compound is selected from the group consisting of trimethoxysilylpropyl (meth) acrylate, vinylpropyltrimethoxysilane, and trimethoxysilylstyrene.

6. The process of claim 1, wherein said polymerizable methoxy silane compound of the formula (I) is used in an amount of at least 3 parts by weight per 100 parts by weight of the monomer (B).

7. The process of claim 6, wherein said polymerizable methoxy silane compound of the formula (I) is used in an amount of at most 30 parts by weight per 100 parts by weight of the monomer (B).

8. The process of claim 1, wherein said monomer (B) comprises a hydroxyl group-containing monomer, an amino group-containing monomer, an amide group-containing monomer, an alkylene glycol mono (meth) acrylate, a pyrrolidane group-containing monomer or a monomer effective for imparting water content to the controlled drug-release contact lens.

9. The process of claim 1, wherein said monomer (B) comprises an alkyl (meth)acrylate, or an alkyl styrene or a combination thereof.

10. The process of claim 1, wherein said monomer (B) comprises an organopolysiloxxane-containing alkyl (meth) acrylate, alkyl vinyl silane or a silicon-containing styrene.

11. The process of claim 10, wherein said organopolysiloxane-containing alkyl (meth) acrylate is tris (trimethylsiloxy) silylpropyl (meth) acrylate.

12. The process of claim 10, wherein said silicon-containing styrene is tris (trimethylsiloxy) silyistyrene.

13. The process of claim 1, wherein said monomer (B) is a flourine-containing monomer of the formula (III):

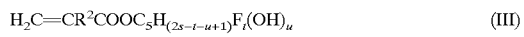

wherein $R^2$ is a hydrogen atom or a methyl group, s is an integer of from 1 to 15, t is an integer of from 1 to (2s+1), and u is an integer of from 0 to 2.

14. The process of claim 13, wherein said flourine-containing monomer is selected from the group consisting of 2,2,2-trifluoroethyl (meth) acrylate and 2,2,2,2',2',2'-hexafluoroisopropyl (meth) acrylate.

15. A control drug-release contact lens, produced by the process of claim 1, having a drug present in the space formed by the first and second members which gradually permeates through the contact lens for release on a cornea during wearing.

* * * * *